(12) United States Patent
Neel et al.

(10) Patent No.: US 10,316,230 B2
(45) Date of Patent: Jun. 11, 2019

(54) POLLUTION REMOVAL COMPOSITION AND USE THEREOF

(71) Applicant: PREVOR INTERNATIONAL, Paris (FR)

(72) Inventors: Mathilde Neel, Asnieres sur Seine (FR); Laurence Mathieu, Talence (FR); Joel Blomet, Valmondois (FR); Marie-Claude Meyer, Paris (FR)

(73) Assignee: PREVOR INTERNATIONAL, Paris (FR)

( * ) Notice: Subject to any disclaimer, the term of this patent is extended or adjusted under 35 U.S.C. 154(b) by 0 days.

(21) Appl. No.: 14/648,026

(22) PCT Filed: Nov. 28, 2013

(86) PCT No.: PCT/FR2013/052894
§ 371 (c)(1),
(2) Date: May 28, 2015

(87) PCT Pub. No.: WO2014/083288
PCT Pub. Date: Jun. 5, 2014

(65) Prior Publication Data
US 2015/0315445 A1 Nov. 5, 2015

(30) Foreign Application Priority Data
Nov. 28, 2012 (FR) ...................... 12 61358

(51) Int. Cl.
*C09K 3/32* (2006.01)
(52) U.S. Cl.
CPC .................... *C09K 3/32* (2013.01)

(58) Field of Classification Search
CPC .................... C09K 3/32; A62D 3/36
See application file for complete search history.

(56) References Cited

U.S. PATENT DOCUMENTS

| 4,770,715 A * | 9/1988 | Mandel ............ B01J 20/20 134/40 |
| 4,865,761 A | 9/1989 | Mandel et al. |
| 5,342,543 A | 8/1994 | Morris et al. |
| 2009/0253879 A1 | 10/2009 | Nishio et al. |

FOREIGN PATENT DOCUMENTS

| CN | 101 215 463 A | 7/2008 |
| GB | 2 085 899 A | 5/1982 |
| GB | 2 293 388 A | 3/1996 |
| WO | 87/06758 A1 | 11/1987 |

OTHER PUBLICATIONS

International Search Report, dated Jun. 3, 2014, from corresponding PCT application.
FR Search Report, dated Jul. 24, 2013, from corresponding FR application.

* cited by examiner

*Primary Examiner* — Peter F Godenschwager
(74) *Attorney, Agent, or Firm* — Young & Thompson

(57) ABSTRACT

A composition includes: (a) at least one neutralizing agent; (b) at least one absorbent agent; and (c) at least one texturing mixture in the form of a mixture including silica gel and an amphoteric texturing agent of which the two pKa (pKa1 and pKa2, $pKa_1$ being less than $pKa_2$) fulfill the following conditions: $pKa_1>2$, $pKa_2<12$, and $<(pKa_1+pKa_2)/2<10$. The composition is useful for removal of pollution.

11 Claims, 2 Drawing Sheets

POLLUTION REMOVAL COMPOSITION AND USE THEREOF

FIELD OF THE INVENTION

Figure 1:
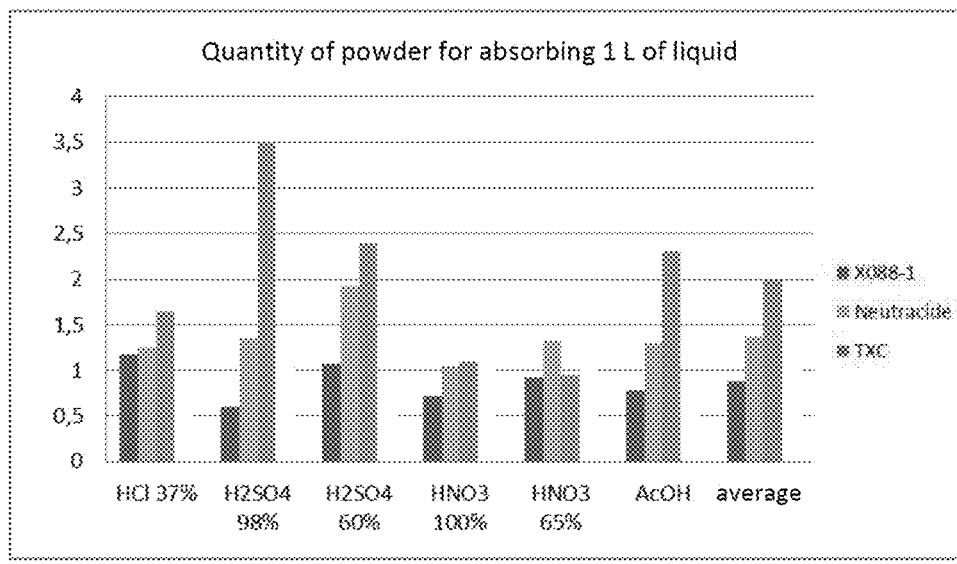

The present invention relates to a pollution removal composition and to the use thereof for fighting chemical pollution caused by accidental spills of acid or base liquids.

Nowadays, we are increasingly exposed to chemical pollution, in our environment, in our food, and at work. In case of an accident, these chemical pollutants potentially pose pollution and safety problems on different scales. For example, a traffic accident of a truck transporting toxic or hazardous raw materials can cause environmental pollution or damage to the road. In industry and in laboratory, an error in the handling of a canister containing a toxic or hazardous raw material can cause injuries to personnel or damage to devices and installations. Thus, the rapid control of pollution is crucial in numerous situations.

Acid and base liquids, which are generally corrosive and to varying degrees aggressive chemical products, are extensively used in laboratories and in different industries.

In the case of an accident, these liquids can in particular cause corrosion of equipment and contact burns.

Pollution removal pertaining to acid and base liquids can be achieved by their simultaneous neutralization and absorption.

PRIOR ART

Numerous compositions for pollution removal for acid and base liquids exist. Thus, absorbent compositions including nanoparticles, for example, Fast Act®, have undergone considerable development in recent years. Although these compositions are effective against liquid and gaseous chemical pollution, they cause strongly exothermic reactions, they are irritant but also entail toxicity hazards associated with the presence of nanoparticles.

A composition including citric acid and an absorbent polymer (cellulose) has also been marketed, for example, under the trade name Neutrabase. This composition is not only irritant, but it also results in a residue in the form of a sticky gel which is not easy to pick up.

A composition including citric acid, starch, and silica has also been marketed, for example, under the trade name Neutracit®. One can also mention a composition including calcium carbonate, sodium carbonate and magnesium oxide (Neutrabsorb®), and a composition including 50% potassium carbonate (Chemizorb H+®). These compositions are irritant and they trigger highly exothermic reactions.

Thus, to date, there exists no pollution removal composition:

(1) that is non-irritant and non-toxic, that is to say which requires no specific labeling,
(2) that allows satisfactory neutralization and absorption of acid or base pollutants,
(3) that is not harmful or hazardous when used,
(4) that together with the pollutant forms a residue that is easy to pick up and that leaves no trace, and
(5) that allows inexpensive pollution removal and pickup of the resulting residues.

In fact, these five criteria can be contradictory.

Now, the present inventors have had the distinction of discovering a pollution removal composition which presents an excellent compromise between these different criteria (1)-(5).

The Present Invention

Thus, the invention relates to a pollution removal composition including:
(a) at least one neutralizing agent,
(b) at least one absorbent agent,
(c) at least one texturing mixture which is a mixture of silica gel and of an amphoteric texturing agent whose two pKa ($pKa_1$ and $pKa_2$, $pKa_1$ being less than $pKa_2$) fulfill the following conditions:

$pKa_1 > 2$, $pKa_2 < 12$, and $5 < (pKa_1 + pKa_2)/2 < 10$.

To the knowledge of the inventors, such a composition has never been disclosed in the prior art.

"Pollution removal" is understood to mean the complete neutralization and the complete absorption of the acid or base liquid pollutants and their retention.

The composition of the present invention:
(1) is not irritant or toxic, that is to say that it does not require a specific labeling,
(2) allows the effective absorption and neutralization of the acid or base liquids,
(2) produces a residue that is easy to pick up and that leaves no trace on the surface from which it is removed,
(3) presents no harmful or hazardous effect when it is used, and
(4) allows inexpensive pollution removal.

BRIEF DECRIPTION OF THE DRAWINGS

FIG. 1 presents the results of an absorption test carried out successively with the following acids: HCl 37%, $H_2SO_4$ 98%, $H_2SO_4$ 60%, $HNO_3$ 100%, $HNO_3$ 65% and AcOH, using, on the one hand, the composition prepared according toe Example 2, and, on the other hand, for comparison purposes, Neutracide®, the absorbent Trivorex® and sepiolite.

Figure 2:
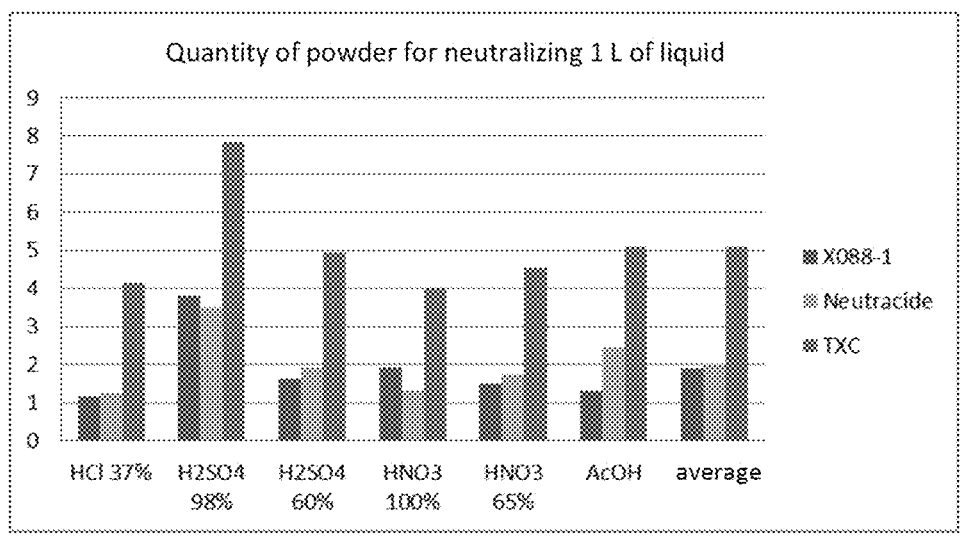

FIG. 2 presents the results of a neutralization test was carried out successively with the following acids: HCl 37%, $H_2SO_4$ 98%, $H_2SO_4$ 60%, $HNO_3$ 100%, $HNO_3$ 65%, and AcOH, using, on the one hand, the composition prepared in Example 2, and, on the other hand, for comparison purposes, Neutracide®, the absorbent Trivorex® and sepiolite.

Figure 3:
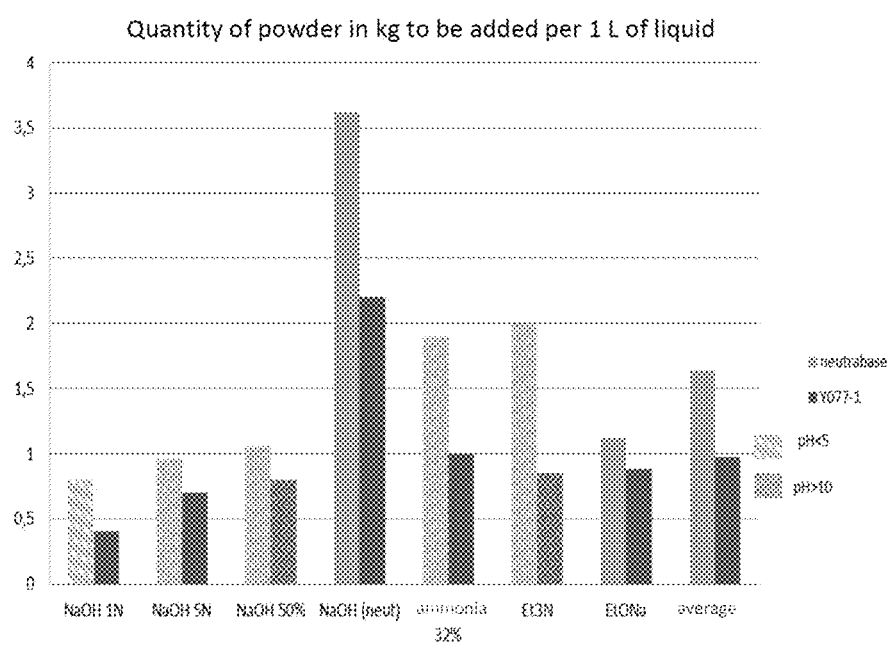

FIG. 3 presents the results of a neutralization test was carried out successively with the following bases: NaOH 1N, NaOH 5N, NaOH 50%, NaOH 50% (neutralization), ammonia 32% triethylamine, and sodium ethanolate 20% in ethanol, using, on the one hand, the composition prepared in 5-1 and, on the other hand, for comparison purposes, Neutrabase®.

DETAILED DESCRIPTION OF THE INVENTION (1) The composition according to the invention is not irritant or toxic, that is to say that it requires no particular labeling or particular precaution during its manufacture and storage. The pollution removal composition of the present invention contains no ingredient that potentially has a presumed or proven harmfulness, such as nanoparticles.

(2) The neutralization and absorption effectiveness is determined by the quantity of composition required for neutralizing and absorbing the polluting liquid.

"Neutralizing" is understood to mean bringing the pH of the mixture of pollutant/pollution removal composition to a value from 5 to 10, even from 6 to 8, and in particular a value of 7.

"Absorbing" is understood to mean converting the pollutant, which is initially in liquid form, to the solid state by mixing it with the pollution removal composition. The smaller the quantity required to absorb and neutralize the polluting liquid is, the more effective said composition will be.

(3) The residue obtained after the acid or base liquid pollution removal by using the composition according to the invention must be easy to pick up.

"Easy to pick up" is understood to refer the fact that the properties of the residue obtained are such that there is no particular technical difficulty in picking it up, and that the pickup procedure can be carried out by means that are commonly used by a person skilled in the art. Thus, the residue obtained by using the composition according to the invention is neither viscous nor sticky but is instead in the form of a solid gel which can easily be removed without leaving a residue stuck to the ground, for example, using a shovel or by suctioning, etc.

The removal of the residue is complete, that is to say that no trace or liquid remains on the surface from which it has been removed. This absence of any trace after removal is an additional safety asset. Indeed, with the commercial products, traces, usually liquid, remain after the pollution removal procedures, making the surfaces slippery and thus capable of causing accidents.

(4) At the time of its use, the composition has no harmful or hazardous effect and can be handled without risk. When it comes in contact with acid or base pollutants, it does not lead to an excessively exothermic reaction, that is to say, to a reaction resulting in an increase in the temperature that would damage the surrounding environment. Moreover, the neutralization reaction is not accompanied by a release of toxic gas.

(5) Finally, the total cost of the pollution removal using the composition according to the invention is low. It should be noted that the total cost of the pollution removal consists not only of the cost of the raw materials and of the manufacture of the composition, but also of the cost of the procedures of picking up and of treating the residues (in particular incineration), hence the advantage of obtaining a residue that is easy to pick up and takes up little space.

Now, owing to its high absorption capacity and its strong neutralizing power, the weight quantity of pollution removal composition used to fight acid or base pollution is low. It is a minimal quantity and thus a minimal weight of waste formed that will have to be stored and/or treated.

The composition of the present invention is present in a powdered solid form and can thus be spread easily around or on the polluting liquid. Its use is simple and rapid.

(a) Neutralizing Agent

A "neutralizing agent" is understood to mean a compound capable of changing the pH of its surrounding environment to a pH from 5 to 10, or from 5.5 to 9, and even from 6 to 8, and in particular a pH of 7.

The neutralization capacity of a compound (or of a composition), expressed in g/mol, corresponds to the quantity by weight of said compound (or of said composition) that needs to be added to 1 mole of strong acid or of strong base so that the resulting pH is from 5 to 10, preferably from 5.5 to 9, and more preferably from 6 to 8.

The neutralizing agents for acid liquids are bases whose pKa is from 7 to 13, preferably from 8 to 12, more preferably from 9 to 10. The neutralizing agents for base liquids are acids whose pKa is from 2 to 7, and preferably from 3 to 6, more preferably from 4 to 5.

According to a particular embodiment of the present invention, said neutralizing agent is selected from calcium carbonate, magnesium carbonate, magnesium oxide, sodium citrate, the amino acids and their salts, such as glycine, glutamic acid, sodium glutamine, succinic acid, and their mixtures. It is preferable to use calcium carbonate, monobasic sodium citrate and their mixtures.

In the case of pollution removal pertaining to acid liquids, one can use, in particular, calcium carbonate, magnesium carbonate, magnesium oxide, the salts of amino acids and their mixtures. It is preferable to use calcium carbonate.

Indeed, calcium carbonate is preferred because it has a high neutralizing power of 20 mol/kg, it is not irritant and not expensive.

Magnesium carbonate can be used, but it has a less satisfactory neutralization power than calcium carbonate, because the reaction kinetics is slower and the resulting product has a texture which makes it difficult to pick up.

Magnesium oxide is irritant, and the salts of amino acids are more expensive than calcium carbonate; this is the reason why they can be used but are not preferred.

In the case of pollution removal pertaining to base liquids, one can use, in particular, sodium citrate, the amino acids such as glycine or glutamic acid and their salts such as monobasic sodium glutamate, succinic acid, and their mixtures. Monobasic sodium citrate is preferred.

(b) Absorbent Agent

"Absorbent agent" is understood to mean solid compounds which have the capacity of absorbing liquids.

According to a particular embodiment of the present invention, the absorbent agent has an absorption capacity from 1 L to 1000 L per 1 kg of said absorbent agent, preferably from 1 L to 500 L per 1 kg of said absorbent agent.

The absorption capacity of a compound (or of a composition) is expressed in kg/L and corresponds to the weight quantity of said compound (or of said composition) that needs to be added for the mixture with 1 L of a given liquid to become solid.

Thus, it can be measured as follows:

1) 1 L of a given liquid is put into a container;
2) a predetermined quantity of the composition of the present invention is added to said container;
3) once the mixture is homogenized, the state (liquid or solid) of the mixture is checked: steps 1) and 2) are repeated until a solid residue is obtained;
4) the quantity in kg of pollution removal composition that has been added corresponds to the capacity of absorption of the given liquid of said composition in kg/L.

In the description, unless otherwise indicated, the absorption values are given for water.

The absorbent agent of the present invention can be an inorganic absorbent agent or a synthetic agent. The inorganic absorbent agent is an agent having a low granulometry (from approximately 80 μm to 200 μm) and a high porosity such that the empty volume with respect to the volume of the granules is approximately 50 to 80%.

The synthetic absorbent agent is a polymer or a copolymer which has a swelling ratio of up to 500, the swelling ratio being the ratio between the volume of the absorbent agent after it has been put in contact with the liquid and has been absorbed, and the initial volume of the absorbent agent before it has been put in contact with the liquid.

The absorbent agent can be an aqueous absorbent agent, that is to say an agent which essentially absorbs aqueous liquids, or an agent capable of absorbing all types of liquids.

The aqueous absorbent agent can be, among others, a polymer or a copolymer of superabsorbent type (sodium polyacrylate, potassium polyacrylate, polyacrylamide, or block copolymer of sodium polyacrylate, potassium polyacrylate, polyacrylamide), and their mixtures.

The copolymer of the polyacrylate/polyamide type can be a sodium polyacrylate/polyacrylamide copolymer, for example, those marketed under the trade names Aquakeep®, Luquasorb®, Tramfloc®, Biosap®, Aquasorb®, and Wastelock®.

This type of copolymer has a good capacity of absorption of aqueous liquids, that is to say it can absorb up to several hundred times its weight of water, but it is expensive. In particular, the copolymer marketed under the trade name Aquakeep® is capable of absorbing and retaining, in some situations, water in a quantity corresponding up to 400 times its dry weight.

Thus, according to another particular embodiment of the present invention, said absorbent agent is a polymer or copolymer of the polyacrylate and/or polyacrylamide type.

These compounds are non-irritant and they release no harmful gas when they are used.

(c) Texturing Mixture

"Texturing mixture" is understood to mean compounds capable of changing the texture of a composition.

The texturing mixture of the present invention is a mixture of silica gel and of an amphoteric texturing agent whose two pKa ($pKa_1$ and $pKa_2$, $pKa_1$ being less than $pKa_2$) fulfill the following conditions:

$pKa_1>2$, $pKa_2<12$, and $5<(pKa_1+pKa_2)/2<10$.

Such texturing agents are solid compounds. They are selected from sodium bicarbonate, potassium bicarbonate, disodium citrate, the amino acids and their salts, such as glycine, glutamic acid, sodium glutamate, and their mixtures. Preferably, the texturing agent is sodium bicarbonate.

These compounds are non-irritant and they release no harmful gas when the composition is used. In particular, sodium bicarbonate functions as an excellent texturing agent for acid or base liquids.

The texturing mixture includes a silica gel, in particular porous silica whose granulometry is between 80 μm and 200 μm.

Such a silica gel is marketed, for example, under the trade names Tixosil 68®, Upasil 60®.

The silica gel present in the composition as texturing agent also has a certain capacity of absorption of liquids.

Tixosil 68® absorbs approximately 3 times its weight of liquids and is relatively inexpensive. It makes it possible to terminate the absorption and to improve the texture of the residue which will be easy to pick up and which will not leave any residual traces.

In the texturing mixture used in the composition according to the invention, the quantity of silica gel is from 1 to 90%, more particularly 20 to 80%, and even more preferably 30 to 70% by weight with respect to the weight of the texturing mixture, the remaining quantity being the amphoteric texturing agent.

The texturing mixture used in the composition according to the invention makes it possible to improve the texture of the composition and that of the residue formed after its use. The residue formed has a texture which facilitates its pickup without leaving traces.

(d) Additives

In addition, the composition according to the present invention can optionally contain at least one additive selected from the pH indicators, the dyes, the perfumes, the flow agents, and their mixtures. The person skilled in the art is able to select, from all these optional additives, both the composition and the quantity of said additives which will be added to the composition, in such a manner that the latter preserves all of its properties.

pH Indicator Agent

"pH indicator agent" is understood to mean a compound which has the capacity of changing color depending on the pH of its surrounding medium.

Examples of pH indicator agents are thymol blue, tropaeolin, bromocresol purple, bromophenol blue, Congo red, neutral red, phenolphthalein, thymolphthalein, alizarin yellow R, bromothymol blue, cresol red, methyl violet, malachite green, methyl yellow, Congo red, methyl orange, bromocresol green, methyl red, phenol red, alizarin, indigo carmine and their mixtures.

Thus, according to a particular embodiment of the present invention, the composition includes, in addition, at least one pH indicator agent selected from tropaeolin, thymol blue, bromocresol purple, bromophenol blue, Congo red, neutral red, phenolphthalein, thymolphthalein, alizarin yellow R, and their mixtures.

The presence of a pH indicator agent makes it possible to visualize the complete neutralization of the acid or of the base to be processed by pollution removal, while using the correct quantity of composition required, and thus lowering the pollution removal cost.

Dyes

As an example of a dye, one can mention any dye that lacks toxicity, for example, a dye of food quality. In particular, one can mention Patent Blue V, carmoisine, tartrazine, etc.

Perfumes

The perfumes can be of natural origin: essential oils of flowers, of fruits, wood bark (cinnamon, sandalwood), resin (incense, myrrh), or they can be of synthetic origin (vanillin, for example).

Flow Agents

To facilitate the spreading of the composition according to the invention, the latter can include flow agents. As examples of such agents, one can mention sand, peat, etc.

According to a particular embodiment of the present invention, the composition of the present invention includes:

(a) from 5% to 70%, preferably from 10% to 65%, and even more preferably from 15% to 60% of at least one neutralizing agent, (b) from 1% to 20%, preferably from 3% to 15%, and even more preferably from 5% to 10% of at least one absorbent agent, and (c) from 5% to 90%, preferably from 10% to 80%, and even more preferably from 20% to 70% of at least one texturing mixture which is a mixture of silica gel and of at least one amphoteric texturing agent selected from sodium bicarbonate, potassium bicarbonate, disodium citrate, the amino acids such as glycine, and their mixtures, (d) from 0% to 0.1%, preferably from 0.005% to 0.08%, and even more preferably from 0.01% to 0.05% of at least one pH indicator agent, said amphoteric texturing agent having two pKa ($pKa_1$ and $pKa_2$, $pKa_1$ being less than $pKa_2$) meeting the following conditions:

$$pKa_1 > 2,$$

$$pKa_2 < 12, \text{ and}$$

$$5 < (pKa_1 + pKa_2)/2 < 10,$$

said percentages being percentages by weight with respect to the total weight of the composition.

According to a particular embodiment of the invention, the composition of the present invention includes:

(a) from 5% to 70%, preferably from 10% to 65%, and even more preferably from 15% to 60% of at least one neutralizing agent selected from calcium carbonate or monobasic sodium citrate, (b) from 1% to 20%, preferably from 3% to 15%, and even more preferably from 5% to 10% of copolymer of the polyacrylate/polyacrylamide type, and (c) from 5% to 90%, preferably from 10% to 80%, and even more preferably from 20 to 70% of texturing mixture which is a mixture of silica gel and of sodium bicarbonate, (d) from 0% to 0.1%, preferably from 0.01% to 0.08%, and even more preferably from 0.02% to 0.05% of at least one pH indicator agent, said percentages being percentages by weight with respect to the weight of the composition.

The highly specific combination of said composition makes it possible to optimize the pollution removal, by the formation of a residue that takes up as little space as possible and is easy to pick up without leaving traces. The residue is also easy to treat and has no corrosive effect, thus lowering the pollution removal cost.

According to a particular embodiment of the present invention, the composition has a capacity of absorption from 0.5 L to 10 L per 1 kg of said composition, preferably from 0.5 to 5 L per 1 kg of said composition, and even more preferably from 1 to 3 L per 1 kg of said composition.

Use

The invention also relates to a pollution removal method using the composition according to the invention.

The method according to the invention includes the following steps:

1) adding the above-described composition to the liquid;
2) waiting until the polluting liquid is absorbed by the composition;
3) checking the pH;
4) repeating steps 1) to 3) until complete neutralization and absorption of the liquid; and
5) picking up the residue.

Step 1) can be carried out in different manners depending on the extent of the pollution. For example, in the case of pollution on the laboratory scale, step 1) can be carried out by manually pouring the composition according to the invention around or on the polluting liquid, and in the case of pollution on a larger scale (such as, a spill from a truck transporting a raw material), step 1) can be carried out by pouring using a dump truck or a fire hose around or on the polluting liquid.

If the polluting liquid is neutralized before its complete absorption, steps 1) and 2) are repeated until the absorption is complete.

In the same way, if the polluting liquid is absorbed, that is to say converted into a solid residue before neutralization, an additional step of a dilution with water of the mixture including the polluting liquid and the composition is added after step 3), and steps 1) to 3) are repeated until the neutralization is complete.

In this case, the composition according to the invention will be added to the diluted residue until the neutralization and absorption are complete.

The dilution step is necessary for acids having a concentration of more than 15 mol·$L^{-1}$ in order to achieve a complete neutralization.

If the composition according to the invention includes a pH indicator, the pH check of step 3) can be carried out visually by means of the colored indicators, and it is no longer necessary to measure the pH by another method such as pH metering or the use of a pH paper.

Once a neutral and solid residue is obtained, the residue is picked up with the means that are conventionally used by the person skilled in the art, for example, using a shovel or by suctioning.

The composition makes it possible simultaneously to absorb and neutralize the acid or base liquids with the use of a minimal quantity of product and at a lower cost in comparison to the products of the prior art.

In addition, the composition of the present invention is not hazardous (non-toxic, non-irritant, non-allergizing, and non-ecotoxic), in contrast to the products of the prior art. In addition, it contains no nanoparticles that pose potential risks for health.

At the time of its use, the composition of the present invention causes no elevation of the temperature that is harmful to the surrounding environment, or, even if a temperature elevation is observed, it is much less than that obtained with the currently marketed products.

Moreover, the pickup of the residue formed is easy, and due to the minimal quantity of product used, its subsequent storage and/or treatment can be carried out at a very reasonable cost.

The invention will now be illustrated by the following nonlimiting examples.

EXAMPLES

In the examples, the following commercial products are used:

Neutracide®, marketed by Haléco, includes 28% of expanded wood cellulose (CAS 65996-61-4), 65% of sodium carbonate (CAS 497-19-8), less than 0.1% of colored indicator (CAS 845-10-3), 2% of absorbent polymer (CAS 009033-79-8), and 5% of sodium phosphate (CAS 7758-80-7).

The absorbent Trivorex® is marketed by PREVOR. It is referred to as TXC in the figures.

Sepiolite is a dried mineral.

Neutrabase®, marketed by Haléco, includes 28% of expanded wood cellulose (CAS 65996-61-4), less than 0.1% of colored indicator (CAS 125-20-2), 2% of absorbent polymer (CAS 009033-79-8), 70% of sodium phosphate (CAS 7558-80-7).

Example 1: Formulation Test

In order to optimize the composition of the present invention, the absorption and neutralization capacities were compared for different formulations.

The results are presented in the following table.

The quantities of ingredients mentioned below are indicated in weight percent.

| Composition | Weight for absorbing 5 mL of HCl at 37% | Weight for absorbing 5 mL of $H_2SO_4$ at 98% |
|---|---|---|
| 1 $CaCO_3$ 30%<br>$NaHCO_3$ 46%<br>Aquakeep ® 24% | 7.6 g (pH = 6.5) | — |
| 2 $CaCO_3$ 20%<br>$NaHCO_3$ 56%<br>Aquakeep ® 24% | 6 g (pH = 5) | 4 g (absorption)<br>14 g + 10 mL $H_2O$<br>(neutralization) |
| 3 $CaCO_3$ 10%<br>$NaHCO_3$ 66%<br>Aquakeep ® 24% | 5.4 g (pH = 5) | 3 g (absorption)<br>17 g + 15 mL $H_2O$<br>(neutralization) |
| 4 $CaCO_3$ 76%<br>Aquakeep ® 24% | 5 g (pH = 5) | 2 g (absorption)<br>30 g + 40 mL $H_2O$<br>(neutralization) |

All the formulations tested produce entirely satisfactory results, superior to those that would be obtained with the currently marketed products.

In particular, formulation 2 presents the best absorbent and neutralizing effect.

Example 2: Special Acid Absorbent

A pollution removal composition, referred to as X088-1, was prepared by mixing the following ingredients.

| Aquakeep SH-F ® | 8% |
|---|---|
| Tixosil 68 ® | 16% |
| Sodium bicarbonate | 56% |
| Calcium carbonate | 20% |

The quantities of ingredients mentioned are indicated in percent by weight.

To this mixture, one adds 0.01% of tropaeolin and 0.02% of thymol blue, with respect to the quantity of said previously prepared mixture.

Example 3: Different Texturing Agents

In order to compare the efficacy of different texturing agents, in the formulation of Example 2, the sodium bicarbonate ($NaHCO_3$) was replaced by the following texturing agents: potassium bicarbonate ($KHCO_3$), glycine and sodium glutamate.

The following acids were used: 5 mL of HCl 37%, $HNO_3$ 65%, $H_2SO_4$ 98% absolute, $H_2SO_4$ 98%, HCl 5N.

The absorption and neutralization results are presented in the following table. The pH of a solution of 1 g of product in 100 mL of water is also measured and the measurements are recorded in the following table.

| | Example 2 | $KHCO_3$ | Glycine | Sodium glutamate |
|---|---|---|---|---|
| HCl 37% | 5.8 g<br>pH > 5 | 7.4 g<br>pH > 5 | 14.2 g<br>pH = 2.38 | 8 g<br>pH < 1 |
| $HNO_3$ 65% | 4.6 g<br>pH = 5 | 7<br>pH = 3.5 | 10.1 g<br>pH = 2.45 | 9 g<br>pH < 1 |
| $H_2SO_4$ 98% abs | 3 g | 8.3 | 12.4 g | 7 g |
| $H_2SO_4$ 98% neut | 10 mL<br>22 g | 10 mL<br>20.6 g | 20 mL<br>24.4 | 20 mL<br>19 g |
| HCl 5N | | 7.5 g | 22 g | 11 g |
| pH 1 g/100 mL $H_2O$ | 7.4 | 8.20 | 7.9 | 8.1 |

All the formulations tested produce entirely satisfactory results, making it possible to obtain a less expensive pollution removal capacity that is just as effective as the currently marketed products. In particular, sodium bicarbonate yields the most favorable results.

Example 4: Special Acid Absorbent

The absorption test was carried out successively with the following acids: HCl 37%, $H_2SO_4$ 98%, $H_2SO_4$ 60%, $HNO_3$ 100%, $HNO_3$ 65%, and AcOH, using, on the one hand, the composition prepared according to Example 2, and, on the other hand, for comparison purposes, Neutracide®, the absorbent Trivorex® and sepiolite. The following protocol was used:

1) 1 L of acid liquid is put in a glass container;
2) The acid liquid is covered with a predetermined quantity of the composition prepared in Example 2, or with one of the above-mentioned comparison compositions.

Once the mixture has been homogenized using a spatula, the (liquid or solid) state of the mixture is checked.

3) Step 2) is repeated until a solid residue is obtained.
4) Once a solid residue has been obtained, said residue is picked up by shovel.

The results of the absorption test are presented in FIG. 1.

In view of these results, one can note that, regardless of the acids and their concentrations, the composition of the present invention (X088-1) showed a better absorption efficacy than the currently marketed products.

Moreover, the cost of treatment using the composition according to the invention is lowered by at least 20%, and even by at least 50% relative to the treatment cost using the currently marketed compositions.

Test of Neutralization of the Polluting Acid Liquid

The neutralization test was carried out successively with the following acids: HCl 37%, $H_2SO_4$ 98%, $H_2SO_4$ 60%, $HNO_3$ 100%, $HNO_3$ 65%, and AcOH, using, on the one hand, the composition prepared in Example 2, and, on the other hand, for comparison purposes, Neutracide®, the absorbent Trivorex® and sepiolite, according to the following protocol:

1) 1 L of acid liquid is put in a glass container;
2) The acid liquid is covered with a predetermined quantity of the composition prepared in Example 2, or with one of the above-mentioned comparison compositions.
3) Once the mixture has been homogenized with a spatula, the color of the mixture is checked in order to determine the pH of the mixture;
4) 100 mL of water are added, and steps 2) and 3) are repeated until a residue having a pH above 5 is obtained.

The results of the test of neutralization of the liquid are presented in FIG. 2.

In view of the results, one can note that, regardless of the acids and their concentrations, the composition of the present invention showed a better neutralization efficacy than the currently marketed products.

Moreover, the cost of treatment using the composition according to the invention is lowered by approximately 20% with respect to the treatment cost using the currently marketed compositions.

In conclusion, the composition simultaneously allows the absorption and neutralization of different acids at different concentrations using a minimal quantity of the product and at a lower cost than that of the currently marketed products.

In addition, the composition is not hazardous (non-toxic, non-irritant, non-allergizing, and non-ecotoxic), in contrast to certain currently marketed products.

Example 5: Special Base Absorbent

5-1. Formulation

A pollution removal composition, referred to as Y077-1, was prepared by mixing the following ingredients.

| | |
|---|---|
| Aquakeep SH-F ® | 6.25% |
| Tixosil 68 ® | 18.75% |
| Sodium bicarbonate | 18.75% |
| Monobasic sodium citrate | 56.25% |

The quantities of ingredients mentioned are indicated in weight percent.

To this mixture, one adds 0.01% of tropaeolin and 0.02% of thymol blue, with respect to the quantity of said previously prepared mixture.

5-2. Test of Neutralization of the Polluting Base Liquid

The neutralization test was carried out successively with the following bases: NaOH 1N, NaOH 5N, NaOH 50%, NaOH 50% (neutralization), ammonia 32% triethylamine, and sodium ethanolate 20% in ethanol, using, on the one hand, the composition prepared in 5-1 and, on the other hand, for comparison purposes, Neutrabase®, according to the following protocol:

1) 1 L of base liquid is put in a glass container;
2) The base liquid is covered with a predetermined quantity of a composition prepared in 5-1, or of the above-mentioned comparison composition.
3) Once the mixture has been homogenized with a spatula, the color of the mixture is checked in order to determine the pH of the mixture;
4) 100 mL of water are added, and steps 2) to 3) are repeated until a residue having a pH of less than 10 is obtained.

The results of the test of absorption/neutralization of base liquids are presented in FIG. 3.

In view of the results, one can note that, regardless of the bases and their concentrations, the composition of the present invention (Y077-1) showed a better absorption and neutralization efficacy than the currently marketed products.

Moreover, the cost of treatment using the composition according to the invention is lowered by at least 20% and even 50% with respect to the treatment cost using the currently marketed compositions.

In conclusion, the composition makes it possible simultaneously to absorb and neutralize different bases at different concentrations using a minimal quantity of product and at a lower cost than that of the currently marketed products.

In addition, the composition is not hazardous (non-toxic, non-irritant, non-allergizing, and non-ecotoxic), in contrast to certain currently marketed products.

The invention claimed is:

1. A pollution removal composition comprising:
   (a) at least one neutralizing agent,
   (b) at least one absorbent agent, and
   (c) at least one texturing mixture which is a mixture of silica gel and of an amphoteric texturing agent whose two pKa values, $pKa_1$ and $pKa_2$, meet the following conditions:

$pKa_1 < pKa_2$, $pKa_1 > 2$, $pKa_2 < 12$, and $5 < (pKa_1 + pKa_2)/2 < 10$, the quantity of silica gel being from 20 to 90% by weight with respect to the weight of the texturing mixture, the remaining quantity being the amphoteric texturing agent, and
   the texturing mixture being present in a quantity ranging from 20% to 90% by weight with respect to the total weight of the composition,
   the absorbent agent being selected from polymers and copolymers of the sodium polyacrylate and/or polyacrylamide type,
   thereby said composition has an absorption capacity from 0.5 L to 10 L per 1 kg of said composition and allows the formation of a reduced mass quantity of a pollution removal residue which is easy to pick up.

2. The composition according to claim 1, wherein the absorbent agent has an absorption capacity from 1 L to 1000 L per 1 kg of said absorbent agent.

3. The composition according to claim 1, wherein the neutralizing agent is selected from calcium carbonate, magnesium carbonate, magnesium oxide, sodium citrate, amino acids and salts thereof, and mixtures thereof.

4. The composition according to claim 3, wherein the amino acids and salts thereof are glycine, glutamic acid, sodium glutamine and succinic acid.

5. The composition according to claim 1, wherein the amphoteric texturing agent is selected from sodium bicarbonate, potassium bicarbonate, disodium citrate, and amino acids and salts thereof, and mixtures thereof.

6. The composition according to claim 5, wherein the amino acids and the salts thereof are glycine, glutamic acid and sodium glutamate.

7. The composition according to claim 1, further comprising, at least one pH indicator agent selected from the group consisting of tropaeolin, thymol blue, bromocresol purple, bromophenol blue, Congo red, neutral red, phenolphthalein, thymolphthalein, alizarin yellow R, and mixtures thereof.

8. The composition according to claim 1, wherein the neutralizing agent is present in a quantity ranging from 5% to 70% by weight with respect to the total weight of the composition.

9. The composition according to claim 1, wherein the absorbent agent is present in a quantity ranging from 1% to 20% by weight with respect to the total weight of the composition.

10. A pollution removal composition comprising:
    (a) from 5% to 70% of at least one neutralizing agent selected from calcium carbonate or monobasic sodium citrate,
    (b) from 1% to 20% of copolymer of the polyacrylate/polyacrylamide type, and
    (c) from 20% to 90% of a texturing mixture which is a mixture of silica gel and of sodium bicarbonate,
    (d) from 0% to 0.1% of at least one pH indicator agent, said percentages being percentages by weight with respect to the total weight of the composition,
    wherein said composition has an absorption capacity from 0.5 L to 10 L per 1 kg of said composition and allows the formation of a reduced mass quantity of a pollution removal residue which is easy to pick up.

11. A pollution removal composition comprising:
    (a) from 5% to 70% of at least one neutralizing agent,
    (b) from 1% to 20% of copolymer of the polyacrylate/polyacrylamide type, (c) from 20% to 90% of a texturing mixture which is a mixture of silica gel and of an amphoteric texturing agent whose two pKa values, $pKa_1$ and $pKa_2$, meet the following conditions:

$$pKa_1 < pKa_2,$$

$$pKa_1 > 2,$$

$$pKa_2 < 12, \text{ and}$$

$$5 < (pKa_1 + pKa_2)/2 < 10,$$

(d) from 0% to 0.1% of at least one pH indicator agent, said percentages being percentages by weight with respect to the total weight of the composition, thereby said composition has an absorption capacity from 0.5 L to 10 L per 1 kg of said composition and allows the formation of a reduced mass quantity of a pollution removal residue which is easy to pick up.

\* \* \* \* \*